United States Patent Office 3,736,315
Patented May 29, 1973

---

3,736,315
1-(3,4-DIMETHOXY-PHENYL) - 4 - METHYL-5-ETHYL-7,8-DIMETHOXY - 5H-2,3-BENZODI-AZEPINE
Jeno Korosi, Tibor Lang, Endre Komlos, and Lujza Erdelyi, Budapest, Hungary, assignors to Egyesult Gyogyszer-es Tapszergyar, Budapest, Hungary
No Drawing. Continuation-in-part of abandoned application Ser. No. 688,674, Dec. 7, 1967. This application Mar. 4, 1971, Ser. No. 121,203
Claims priority, application Hungary, Dec. 9, 1966, GO-1,000
Int. Cl. C07d 53/04
U.S. Cl. 260—239 BD                                        1 Claim

ABSTRACT OF THE DISCLOSURE 1-(3,4 - dimethoxy - phenyl) - 4 - methyl - 5 - ethyl-7,8-dimethoxy-5H - 2,3 - diazepine having the following formula

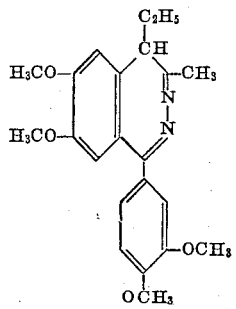

This new compound is non-toxic and pharmacologically active. Its acid addition salts also have useful pharmacological activities.

---

This application is a continuation-in-part of copending application Ser. No. 688,674 filed on Dec. 7, 1967, now abandoned.

This invention relates to a new benzodiazepine derivative of pharmacological value. More particularly, it is concerned with the new 1-(3,4-dimethoxy-phenyl)-4-methyl - 5 - ethyl - 7,8 - dimethoxy - 5H - 2,3-diazepine having the following formula

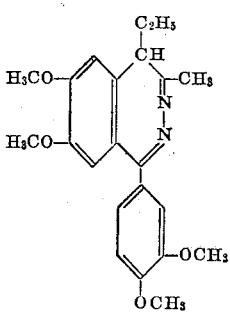

and its non-toxic salts.

The new compound according to the invention can be conveniently prepared by several methods. According to a preferable method (a) 3,4,3',4'-tetramethoxy - 6 - (α - aceto - propyl)benzophenone is reacted with hydrazine or hydrazine hydrate, the obtained product is transformed with an acid, preferably with an inorganic acid, to a salt, wherein, if desired, the 2 reactions can be simultaneously carried out and the benzodiazepine is released from the thus-obtained salt by treating with an acid-binding agent, or (b) an 1 - (3,4 - dimethoxy - phenyl) - 3 - methyl-4-ethyl-6,7-dimethoxy-isobenzopyrilium salt is reacted with hydrazine or hydrazine hydrate and, if the hydrazine was not employed in a considerable excess, the benzodiazepine is released with an acid binding agent, and finally, if desired, the free benzodiazepine is transformed to an acid addition salt by reacting with an acid.

In the reaction according to paragraph (a) at first 3,4,3',4' - tetramethoxy - 6 - (1 - ethyl - 2 - hydrazone-propyl)-benzophenone is formed. This intermediate compound is new and it is transformed to benzodiazepine derivative by reacting with an acid. The two reactions can be preferably carried out simultaneously. Ammonium hydroxide, alkali hydroxides, carbonates and hydrogen carbonates can be conveniently employed as acid binding agents.

It is preferable to carry out the above-described reactions in a solvent, such as a lower aliphatic alcohol or a mixture thereof. The releasing of the salt is preferably carried out in an aqueous medium.

It is mentioned that the free benzodiazepine separates with one mole of crystal water, and this monohydrate melts at 95–115° C. but it loses its crystal water by heating, preferably under vacuum, or by recrystallizing from an alkanol. The free benzodiazepine having no crystal water melts at 156–157° C.

The new compound according to the invention as well as its acid addition salts can be presented as pharmaceutically acceptable compositions by formulating them alone or with other pharmaceutically active compounds, if desired, together with carrier, binding, filling, surface-active, flavouring, etc. agents usable in the pharmaceutical industry, in any of the usual ways, to medicines.

The methods for preparing the starting compounds are described in the technical literature as follows:

(a) 3,4,3',4' - tetramethoxy - 6 - (α - aceto - propyl)-benzophenone: Ber. 75, 891 (1942); J.A.C.S. 72, 1118 (1950).
(b) Isobenzopyrilium salts: Ber. 77, pages 6 and 12 (1944); J. Org. Chem. 19, 472 (1954).

The new compound according to the invention and its acid addition salts possess valuable pharmacological properties. They show an excellent tranquillizing effect. The $ED_{50}$ per os value of the free base amounts to 45 mg./kg. while that of the Meprobamate amounts to about 200 mg./kg. and that of the Trimethoxine to about 130 mg./kg. The effect of the 3,4,3',4'-tetramethoxy-6-(1-ethyl-2-hydrazono-propyl)-benzophenone prepared as intermediate product attains the effect of the minor tranquillizing compounds; its $ED_{50}$ amounts of 160 mg./kg. and its $LD_{50}$ value amounts to 1600 mg./kg.

The new compound according to the invention and its methods of preparation are further illustrated by the aid of the following examples.

EXAMPLE 1

4.00 g. (0.01 mole) of 3,4,3',4' - tetramethoxy - 6 - (1-ethyl - 2 - hydrazono - propyl) - benzophenone is dissolved in 20 ml. of methanol saturated with gaseous hydrogen chloride and the thus-obtained orange-coloured solution is evaporated nearly to dryness. 20 ml. of a 5% NaOH solution are added whereupon the white 1 - (3,4 - dimethoxy-phenyl) - 4 - methyl - 5 - ethyl - 7,8 - dimethoxy - 5H-2,3-benzodiazepine is separated. The product is filtered and washed with 2 x 2 ml. of water. The dry raw product is dissolved in 10 volumes of isopropanol, clarified with charcoal and then crystallized. Yield: 2.7 g. (71%). M.P.: 156–157° C.

Analysis data for $C_{22}H_{26}N_2O_4$ (382.45): Calculated (percent): C, 69.09; H, 6.85; N, 7.33. Found (percent): C, 69.07; H, 6.63; N, 7.39.

The hydrochloride ($C_{22}H_{27}ClN_2O_4$) of the 5H-2,3-benzodiazepine derivative decomposes at 217.5° C. and its picrate ($C_{22}H_{26}N_2O_4 \cdot C_6H_3N_3O_7$) at 204° C.

The starting compounds are prepared in the following way:

(a) 3,4,3',4' - tetramethoxy - 6 - (1 - ethyl-2-hydrazono-propyl-benzophenone.

A mixture of 38.64 g. (0.1 mole) of 3,4,3',4'-tetramethoxy-6-(α-aceto-propyl)-benzophenone, 15 g. (0.3 mole) of 100% hydrazine hydrate and 200 ml. of abs. ethanol is refluxed for 3 hours. Thereafter the reaction mixture is held in a refrigerator for a night. The white granular precipitate is filtered, washed with 2 x 20 ml. abs. ethanol and dried at room temperature.

Yield: 24.8 g. (62%). Melting point: 134–136° C. N, percent: 6.90.

The thus-obtained crude product is crystallized from 8 volumes of ethanol. The obtained product weighs 22.5 g. Melting point: 136° C.

Analysis data for $C_{22}H_{27}ClN_2O_4$ (418.92). Calculated (percent): C, 65.98; H, 7.05; N, 7.00. Found (percent): C, 66.16; H, 7.53; N, 7.05.

If one proceeds as described above but only with 0.1 mole of hydrazine hydrate then the product is obtained with a yield of 49% and melts at 133–136° C.

EXAMPLE 2

A mixture of 3.86 g. (0.01 mole) of 3,4,3',4'-tetramethoxy-6-(α-aceto-propyl)-benzophenone, 0.011 mole of hydrazine or of 60–100% hydrazine hydrate, 60 ml. of ethanol and 0.005 mole of sulfuric acid is boiled for 10 hours. The reaction mixture is evaporated and the residue is treated by the method as described in Example 1.

In this way 2.55 g. of the benzodiazepine derivative is obtained with a melting point of 156° C.

EXAMPLE 3

4.41 g. (0.01 mole) of 1-(3,4-dimethoxy-phenyl)-3-methyl - 4 - ethyl-6,7-dimethoxy-isobenzopyrilium-chloride hydrochloride ($C_{22}H_{26}Cl_2O_5$) are dissolved in 35 ml. of methanol at a temperature of 40° C. After cooling to 20–25° C., 0.75 g. (0.015 mole) of 100% hydrazine hydrate dissolved in 5 ml. of methanol are added whereupon the orange-coloured solution is getting light yellow. The reaction mixture is evaporated to dryness. The residue is digested with 3 ml. of water, cooled to 0° C. and filtered. The obtained yellow hydrochloride of the benzodiazepine derivative decomposes at 205° C. Weight: 3.3 g. After digesting with ethyl-acetate, the product decomposes at 217.5° C.

Analysis data for $C_{22}H_{27}ClN_2O_4$ (418.92). Calculated (percent): N, 6.69; Cl, 8.46. Found (percent): N, 6.52; Cl, 8.21.

2 g. of the thus-prepared hydrochloride are dissolved in 15 ml. of water and the pH of the solution is set to a value of 11–12 with a concentrated solution of ammonia or NaOH. A voluminous white precipitate separates out.

The precipitate is filtered, washed with water and dried at 30° C. until constant weight. In this way 1.6 g. product are obtained.

Analysis data for $C_{22}H_{26}N_2O_4 \cdot H_2O$ (400.46): Calculated (percent): C, 65.98; H, 7.05; N, 7.00. Found (percent): C, 65.59; H, 7.29; N, 6.95.

The product loses its crystal water even during recrystallization. 0.5 g. of the product are dissolved in 5 ml. of hot isopropanol, the solution is evaporated to half of its volume and then is put into a refrigerator. The light cream-coloured, transparent granular crystals melt at 156–157° C. Yield: 0.45 g.

The same end product is obtained if the same method is employed as above but 1 - (3,4 - dimethoxy - phenyl)-3-methyl - 4 - ethyl - 6,7 - dimethoxy-isobenzopyrilium hydrogen-sulphate ($C_{22}H_{26}O_9S$) is employed as starting compound.

EXAMPLE 4

0.01 mole of one of the isobenzopyrilium salts as employed according to Example 3 is dissolved in 50 ml. of lukewarm methanol. 1.25 g. (0.025 mole) of 100% hydrazine hydrate are added to the dark yellow solution whereupon the solution lightens in colour. The reaction mixture is evaporated nearly to dryness. After adding 20 ml. of water, the benzodiazepine containing crystal water is filtered and washed with 2 x 2 ml. of water. The dry crude product (3.3 g.) is dissolved in 10 volumes of isopropanol. The solution is clarified with charcoal. After crystallization 2.8 g. (73.5%) product are obtained with a melting point of 156–157° C.

What we claim is:

1. The pharmacologically active 1-(3,4-dimethoxyphenyl) - 4 - methyl - 5 - ethyl-7,8-dimethoxy-5H-2,3-benzodiazepine having the following formula

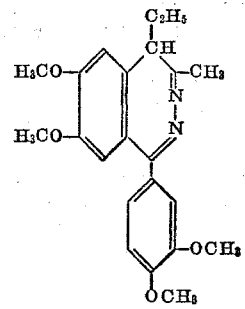

and its nontoxic acid addition salts.

References Cited

Archer et al. Chem. Reviews, vol. 68, p. 781 (1968).

ALTON D. ROLLINS, Primary Examiner

U.S. Cl. X.R.

260—566 B; 424—244